US006960108B1

(12) United States Patent
Jaszewski et al.

(10) Patent No.: US 6,960,108 B1
(45) Date of Patent: Nov. 1, 2005

(54) PROTECTIVE CONTAINMENT DEVICE FOR WIRES AND HOSES OF AN OUTBOARD MOTOR

(75) Inventors: Wayne M. Jaszewski, Jackson, WI (US); John M. Griffiths, Fond du Lac, WI (US); George E. Phillips, Fond du Lac, WI (US)

(73) Assignee: Brunswick Corporation, Lake Forest, IL (US)

(*) Notice: Subject to any disclaimer, the term of this patent is extended or adjusted under 35 U.S.C. 154(b) by 240 days.

(21) Appl. No.: 10/228,032

(22) Filed: Aug. 26, 2002

(51) Int. Cl.[7] .............................................. B63H 20/32
(52) U.S. Cl. ..................... 440/77; 440/113; 174/152 G
(58) Field of Search .......................... 440/77, 113, 76; 174/152 G, 153 G; 123/143 C

(56) References Cited

U.S. PATENT DOCUMENTS

| | | | | |
|---|---|---|---|---|
| 2,517,717 A | * | 8/1950 | Bernhard | 174/152 G |
| 3,162,412 A | * | 12/1964 | McEntire | 174/153 G |
| 3,564,113 A | * | 2/1971 | Kindler | 174/153 G |
| 4,415,219 A | | 11/1983 | Kuhl et al. | 339/195 |
| 4,517,408 A | | 5/1985 | Pegram | 174/153 |
| 4,652,072 A | | 3/1987 | Arasi, Jr. | 339/103 |
| 4,679,123 A | | 7/1987 | Young | 361/428 |
| 5,353,758 A | | 10/1994 | Masuda et al. | 123/143 |
| 5,637,021 A | * | 6/1997 | Watanabe | 440/77 |
| 5,836,212 A | * | 11/1998 | Bates | 74/502.6 |
| 6,183,322 B1 | * | 2/2001 | Takahashi | 440/76 |
| 6,364,724 B1 | * | 4/2002 | Nozawa et al. | 440/77 |

* cited by examiner

Primary Examiner—Lars A. Olson
(74) Attorney, Agent, or Firm—William D. Lanyi

(57) ABSTRACT

A protective containment device is provided to serve as a strain relief component for hoses, wires, and push-pull cables extending through a front surface of an outboard motor. The protective containment device is formed from first and second portions that are assembled together with a flexibly connected divider that segregates certain components within the protective device from other components. A cylindrical ring, made of first and second retainers, is disposed around an outer surface of the cylindrical conduit to hold the first and second portions together and to retain a flexible tube in place.

20 Claims, 5 Drawing Sheets

PROTECTIVE CONTAINMENT DEVICE FOR WIRES AND HOSES OF AN OUTBOARD MOTOR

BACKGROUND OF THE INVENTION

1. Field of the Invention

The present invention relates generally to a protective containment device for an outboard motor and, more particularly, to a generally tubular structure shaped to extend through a wall of the outboard motor and maintain certain hoses, cables, and wires separate from certain other cables.

2. Description of the Prior Art

In many different applications, it is necessary to pass certain wires, cables, and conduits through a wall or other solid structure. Those skilled in the art are familiar with various techniques for performing that task. Skilled artisans are also familiar with many different techniques for bundling wires and/or conduits together in a compact structure.

U.S. Pat. No. 4,652,072, which issued to Arasi, Jr. on Mar. 24, 1987 describes a cable-connector assembly. The assembly is adapted to be removably secured to a housing of a multiple connection device. The assembly has a cable with at least one end, and the cable includes a plurality of insulated conductors encased therein and extending beyond the at least one end of the cable for electrical connection within the housing of the multiple connection device, respectively. A connector is releasably secured in stress relief association with a part of the cable at least generally adjacent the at least one end thereof. The connector includes a sleeve disposed about the cable part and yieldable at least in part for releasable gripping engagement with the cable part, and means is associated with the sleeve for exerting a force thereon to effect the yielding of the at least part of the sleeve means into the releasable gripping engagement thereof with the cable part thereby to releasably secure the connector in the stress relief association thereof with the cable part.

U.S. Pat. No. 4,517,408, which issued to Pegram on May 14, 1985, describes a self-centering cable fastener. A bipartite cable fastener in which abutting faces of the respective parts are provided with complementary camming surfaces extending in orthogonal directions to center the body parts both axially and transversely during movement of the faces together. A laterally extending, mounted flange and detent shoulder are provided on each part in axially spaced relation for securing the fastener in a panel aperture, a socket for a release tool extending axially from one face to a location adjacent the shoulder and a stress relieving cavity being formed in the opposite face to extend axially between the socket and the cable.

U.S. Pat. No. 5,353,758, which issued to Masuda et al on Oct. 11, 1994, describes a wiring arrangement for an outboard motor. The wiring arrangement includes a circular wire harness body fitted within a casing that is secured to the upper portion of the engine of the outboard motor. The wire harness body has sets of branch wires that extend outwardly and which may also extend through slots formed in the sidewall of the casing for coupled connection with branch leads that extend to various electrical components of the engine. The branch wire connectors may alternatively be formed integrally with the slots in the casing at which point the branch leads may be connected. Another embodiment provides tube-like extensions which extend outwardly from the slots to protect the branch wires. The branch leads and the coupled connections may also be contained within the tube-like extensions for protection.

U.S. Pat. No. 4,679,123, which issued to Young on Jul. 7, 1987, describes a cable organizing and protection system and method. Multiple conductor cables are connected to horizontally distributed component equipments within a vertical array inside a cabinet. The cables are brought into the cabinet through or near the bottom and a clear space is provided within the cabinet generally parallel to the arrays. Each array has a plurality of cables, each consisting of a plurality of conductors. Starting with the lowermost, the cables to connect to a given equipment are collected into a bundle by retainer means, preferably a resilient U-shaped clip which can be sprung to fit into a hole in a plate along a cabinet wall. The cables are terminated in connector means which are plugged into horizontally distributed mating connectors for each component equipment supported on a stress relief panel supported by the cabinet. The clip for each bundle of cables is generally at the level of the component equipment to which it attaches so that it carries most of the weight of the cables. The lowermost component equipment is connected first and its retainer is supported on the cabinet closest to the array. Later component equipments are connected in sequence from the lowermost to the uppermost and their cable retainers are supported on the cabinet in a pattern progressively further from the strain relief panel but always close to the level of the component equipment to which they are connected.

U.S. Pat. No. 4,415,219, which issued to Kuhl et al on Nov. 15, 1983, describes a connector with removal stress relief construction. A low profile electrical connector assembly for insertion into a mating socket having a connector body whose pin to lead wire input configuration is nonlinear is described. The connector body includes a nose-like projection which acts to reduce the lateral stress imposed on the connector pins when the assembly is removed from its mating socket by a pulling force exerted on the lead wires.

The patents described above are hereby expressly incorporated by reference in the description of the present invention.

The hoses, wires, and cables connected to an outboard motor experience significant movement, particularly in the region immediately in front of the outboard motor. Since the outboard motor pivots about a vertical steering axis and the hoses, wires, and cables are generally fixed within the boat in front of the outboard motor, those hoses, wires, and cables experience significant flexing as the outboard motor moves back and forth about its vertical steering axis. It would therefore be significantly beneficial if a device was provided to act as a strain relief for the hoses, wires, and cables and, additionally, to separate certain cables from other wires and hoses because those certain cables experience flexing in the normal course of their use. More specifically, push-pull cables experience some movement as a result of their normal use even when the outboard motor is not pivoting about its vertical steering axis. It would therefore be significantly beneficial if a device could be provided which segregates certain cables, such as push-pull cables, from other wires and hoses that do not experience this type of movement through the normal course of their operation.

SUMMARY OF THE INVENTION

A protective containment device for an outboard motor, made in accordance with the preferred embodiment of the present invention, comprises a first portion shaped to be received in an opening formed through a surface of an outboard motor and a second portion shaped to be received in that same opening formed through the surface of the outboard motor. The first and second portions are shaped to be attached together to form a generally tubular conduit having a cavity formed therein. A divider is disposed within the generally tubular conduit between a first region of the cavity and a second region of the cavity. The first and second regions are each shaped to receive a component selected from the group consisting of electrical wires, hoses, and push-pull cables.

In a particularly preferred embodiment of the present invention, the divider is formed as an integral extension of the first portion and is flexibly attached to the first portion. The divider is formed as the integral part of the first portion, with the divider being contiguous with the first portion along a flexible hinge which is made of the same material as the divider and the first portion. The divider is movable between a first position which is in a position to divide the cavity into the first and second regions and a second position which is away from the position to divide the cavity into the first and second regions. In a preferred embodiment of the present invention, the generally tubular conduit is cylindrical with two open ends.

A preferred embodiment of the present invention further comprises a first retainer and a second retainer. The first and second retainers are shaped to be attached together to form a cylindrical ring. The cylindrical ring is shaped to receive an outer surface of the generally tubular conduit. A flexible tube is disposed around an end of the generally tubular conduit between the outer surface of the generally tubular conduit and an inner surface of the cylindrical ring. A plurality of pointed protrusions are formed on the inner surface of the cylindrical ring in order to provide a more secure attachment between the first and second retainers and the flexible tube.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
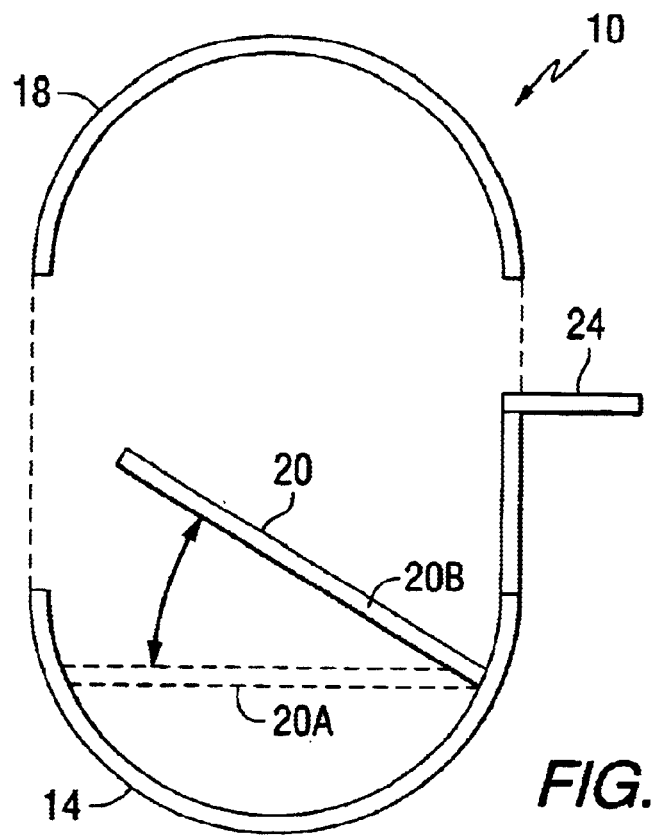
FIG. 1 is a simplified representation of certain components of the present invention.

Throughout the description of the preferred embodiment of the present invention, like components will be identified by like reference numerals.

FIG. 1 is a highly simplified schematic representation of the present invention and is provided to describe its basic components. The protective containment device 10 comprises a first portion 14 which is shaped to be received in an opening formed through a surface of an outboard motor. A second portion 18 is shaped to be received in the same opening formed through the surface of the outboard motor. The first and second portions, 14 and 18, are shaped to be attached together to form a generally tubular conduit having a cavity formed therein. A divider 20 is disposed within the generally tubular conduit between a first region below the divider 20 and a second region above the divider 20. The divider 20 can assume a first position 20A or a second position 20B. The first and second regions are each shaped to receive a component such as a wire, a hose, or a push-pull cable. The first portion 14 is provided with an extension 24 that allows the assembled device to be rigidly attached to the outboard motor.

Figure 2:
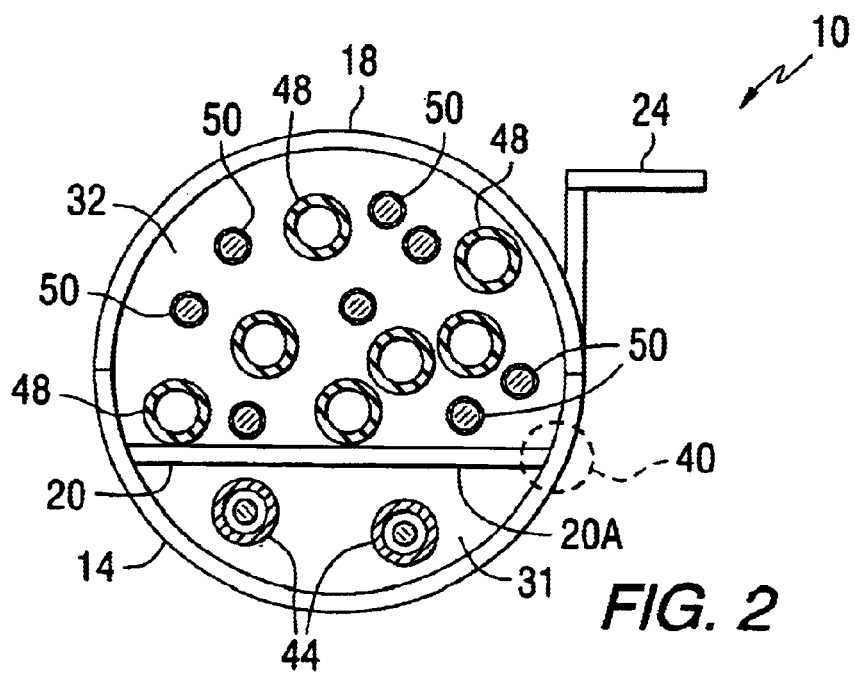
FIG. 2 is an assembled view of the components shown in FIG. 1.

FIG. 2 shows the assembled protective containment device 10 of the present invention. The first portion 14 and the second portion 18 are attached together to form a generally tubular conduit that has a cavity formed therein. A first region 31 of the cavity is located below the divider 20 and a second region 32 of the cavity is located above the divider 20. As will be described in greater detail below, the divider 20 is hinged to the first portion 14 in the region identified by the dashed circle 40 in FIG. 2.

With continued reference to FIG. 2, it can be seen that two push-pull cables 44 are shown located within the first region 31 of the cavity enclosed within the first and second portions, 14 and 18. In the second region 32, a plurality of hoses 48 and wires 50 are contained above the divider 20. One of the important benefits of the present invention is that the push-pull cables 44 are segregated from the hoses 48 and wires 50 within the cavity of the protective containment device 10. During normal operation, the push-pull cables 44 may tend to flex when the internal wires of those cables are actively moving within the outer sheaths of those cables. This flexing could abrade the outer surfaces of the various components, such as hoses 48 and wires 50, if the push-pull cables were not segregated from them.

Figure 3:
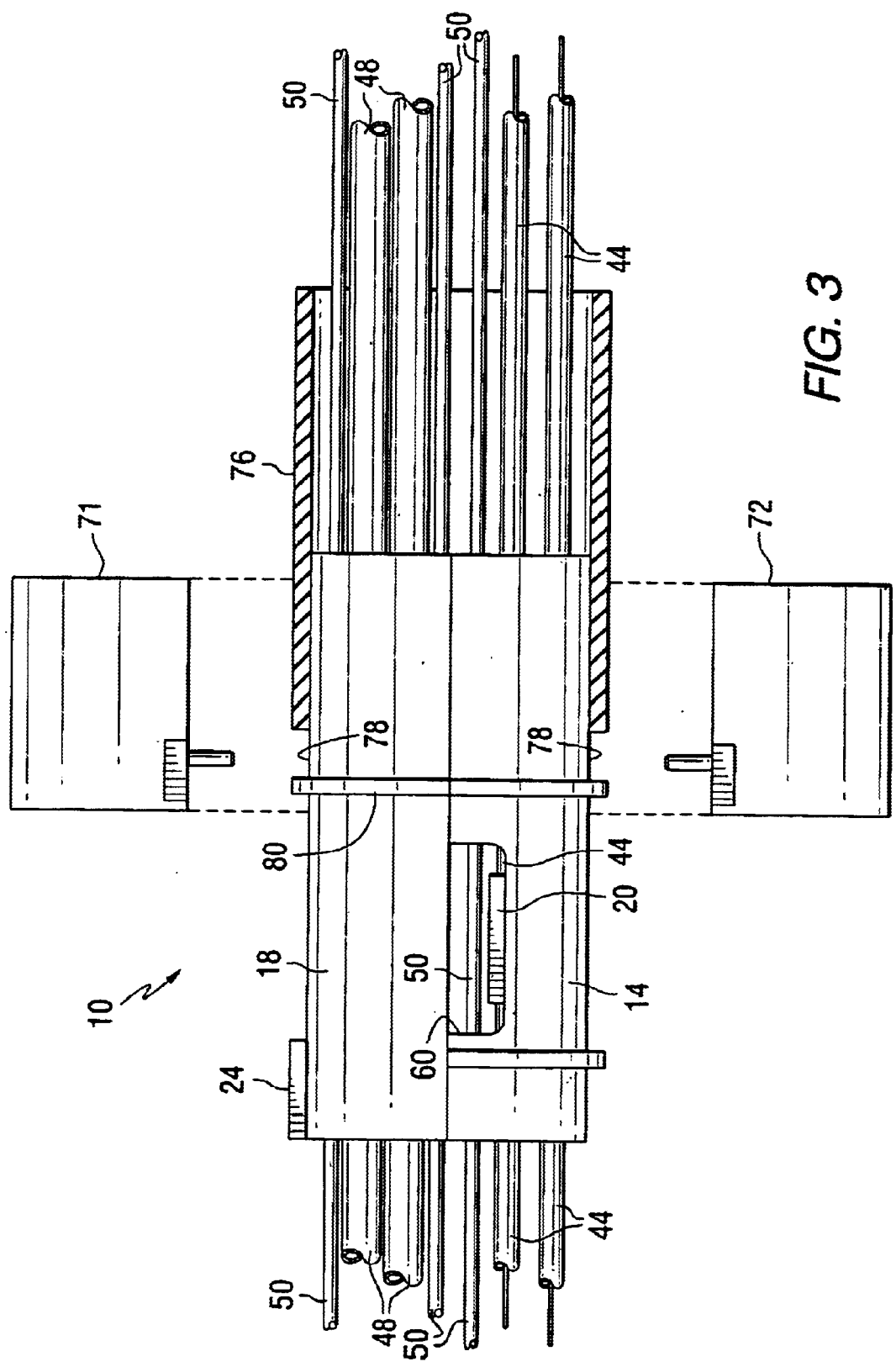
FIG. 3 is a side view of FIG. 2.

FIG. 3 is a side view of the protective containment device 10 showing the first and second portions, 14 and 18, attached together and with the divider 20 visible through an opening 60 formed in the side of the first portion 14. Extending through the generally tubular conduit inside the protective containment device 10 are the push-pull cables 44, the hoses 48, and the wires 50. In this example, the hoses 48 and wires 50 are disposed above the divider 20 and the push-pull cables 44 are disposed below the divider 20. This places the push-pull cables 44 in the first region 31 of the internal cavity and the hoses 48 and wires 50 in the second region 32 of the internal cavity, as discussed above in conjunction with FIG. 2.

With reference to FIGS. 1–3, it should be understood that the divider 20 is movable between a first position 20A, as represented by dashed lines in FIG. 1, which is in a position to divide the cavity into the first and second regions, 31 and 32, as described above. The divider 20 is also movable to the position identified by reference numeral 20B in FIG. 1 which is away from the position to divide the cavity into the first and second regions, 31 and 32. Both the first and second positions are illustrated in FIG. 1, with the first position being represented by dashed lines. The divider 20 is shown in the first position 20A in FIG. 2. Similarly, the divider 20 is shown in the first position in FIG. 3.

In FIG. 3, the protective containment device 10 is shown with a first retainer 71 and a second retainer 72. The first and second retainers, 71 and 72, are shaped to be attached together to form a generally cylindrical ring which, in turn, is shaped to receive an outer surface 78 of the generally tubular conduit. FIG. 3 also shows a flexible tube 76, or protective hose, which is disposed around an end of the generally tubular conduit of the present invention. It should be noted that the flexible tube 76 is disposed between the outer surface 78 of the generally tubular conduit of the present invention and an inner surface of the cylindrical ring formed by the first and second retainers, 71 and 72. When the first and second retainers are attached together to form the generally cylindrical ring, the cylindrical ring is retained in position by the ridge 80 formed on the generally tubular conduit of the protective containment device 10 and the flexible tube 76 is retained in position because of its location between the outer surface 78 and an inner surface of the generally cylindrical ring. In order to more firmly hold the flexible tube 76 in place, a plurality of pointed protrusions are formed on the inner surface on the generally cylindrical ring. These pointed protrusions, which are formed on the inner surfaces of both the first and second retainers, 71 and 72, will be described and illustrated in greater detail below.

Figure 4:
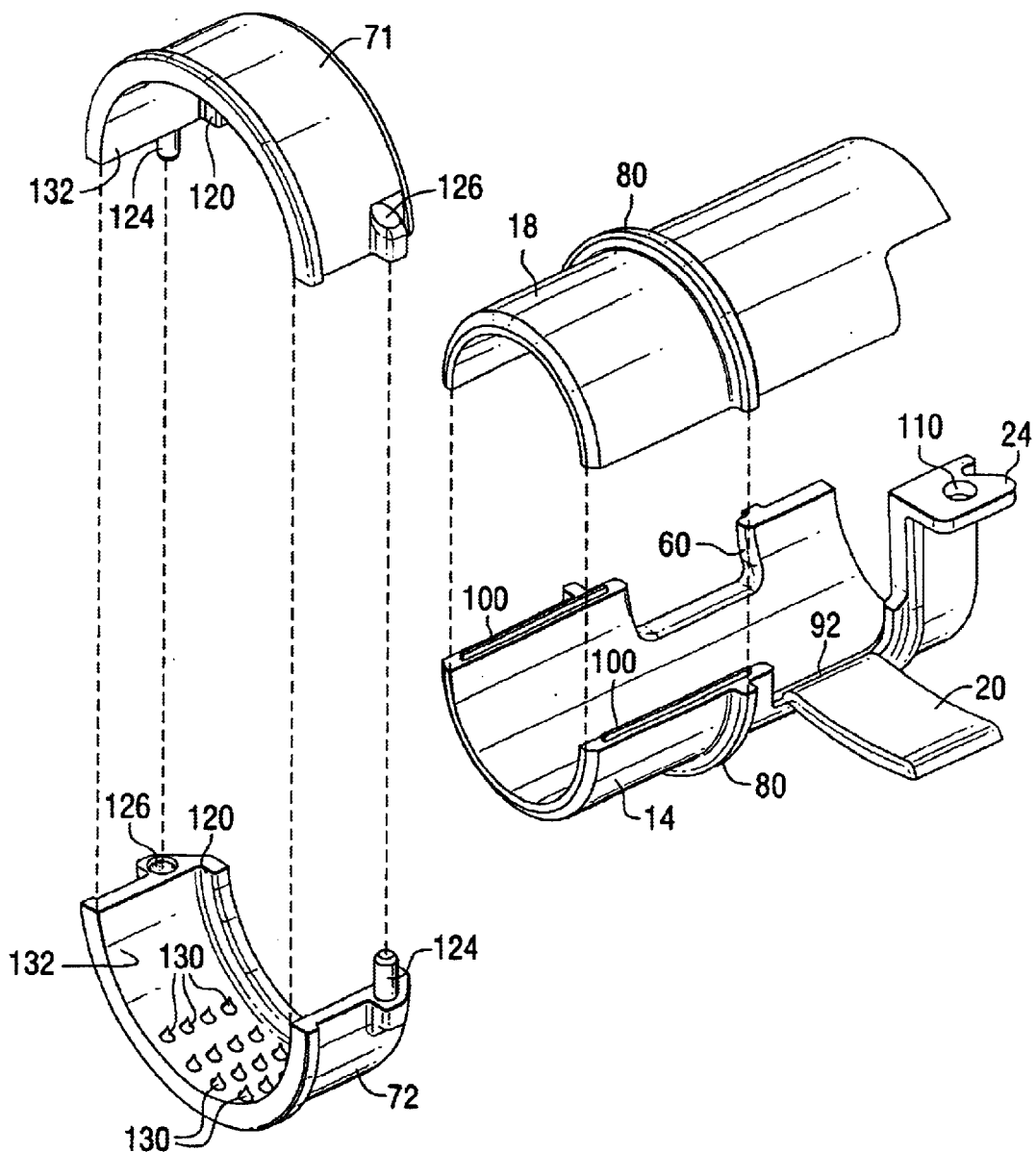
FIG. 4 is an exploded isometric view of the present invention.

FIG. 4 is an exploded isometric view of the protective containment device 10 of the present invention. As can be seen, the first and second portions, 14 and 18, are shaped to fit together to define a generally cylindrical tubular conduit. The divider 20 is formed as an integral part of the first portion 14. The divider 20 is contiguous with the first portion 14 along a flexible hinge 92 which is made of the same material as both the divider 20 and the first portion 14. The divider 20 is pivotable about the flexible hinge 92 so that it can be moved to either the first position, which is in a position to divide the cavity into the first and second regions, 31 and 32, described above, and the second position which is away from the position to divide the cavity into the first and second regions. In FIG. 4, the divider 20 is shown in the second position.

With continued reference to FIG. 4, blade-like ridges 100 are formed as part of the first portion 14 and shaped to be received in narrow slots (not shown in FIG. 4) formed in the second portion 18. When the blade-like protrusions 100 are inserted into the narrow slots of the second portion 18, the first and second portions are held in a desired position relative to each other.

With reference to FIGS. 1–4, push-pull cables 44 can be placed into the cavity before the second portion 18 is inserted on the first portion 14. Then, the divider 20 can be rotated about the flexible hinge 92 to its first position which divides the cavity into the first and second regions, 31 and 32. After the hinge 20 is moved to the first position, the hoses 48 and the wires 50 can be disposed into the partial cavity defined by the first portion 14. When this is complete, the second portion 18 can be installed on the first portion 14 with the blade-like protrusions 100 inserted into the narrow slots of the second portion 18 to assure a proper positioning of the first and second portions relative to each other. By using the extension 24, and particularly the hole 110, the first portion 14 can be rigidly attached to a component of the outboard motor.

After the first and second portions, 14 and 18, are attached together, the first and second retainers, 71 and 72, can be disposed around the outer surface of the protective containment device. The surfaces 120 of the first and second retainers, 71 and 72, are shaped to be placed against the outer ridge 80 in order to hold the first and second retainers, 71 and 72, in position relative to the first and second portions, 14 and 18. As can be seen in FIG. 4, pins 124 and holes 126 are provided to attached the first and second retainers, 71 and 72, together in their proper positions relative to each other. The plurality of pointed protrusions 130 are visible on the inner surface 132 of the second retainer 72. It should be understood that the first and second retainers, 71 and 72, are identical to each other and both contain the plurality of pointed protrusions 130.

FIGS. 5–9 are partial isometric representations that will be used to describe the sequence of operations used in conjunction with the present invention to protect and contain a plurality of hoses 48, wires 50, and push-pull cables 44 in the region where they pass through a wall of an outboard motor.

Figure 5:
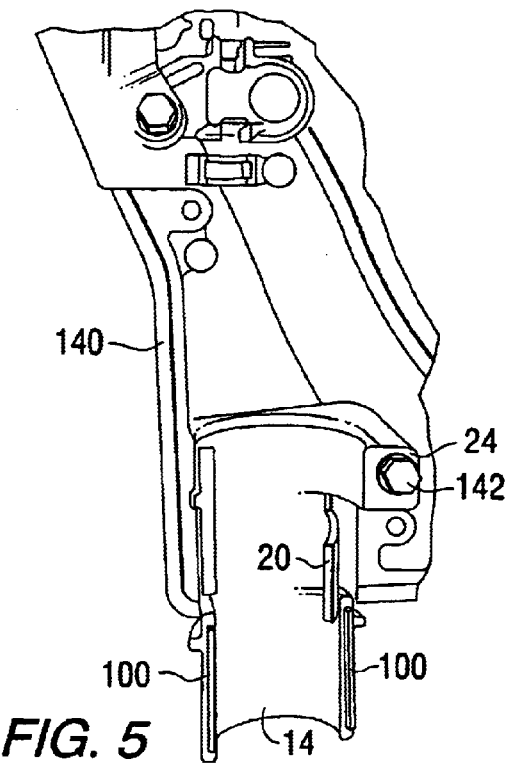
FIGS. 5–9 are sequential isometric representations of the use of the present invention in conjunction with an outboard motor.

In FIG. 5, the first portion 14 is rigidly attached to an outboard motor 140 through the use of a bolt 142 which is extended through the hole 110 of the extension 24. The divider 20 is shown in its second position which is away from the position to divide the cavity into the first and second regions, 31 and 32, described above in conjunction with FIG. 2. For purposes of reference, the blade-like protrusions 100 are shown extending from the first portion 14 of the protective containment device.

Figure 6:
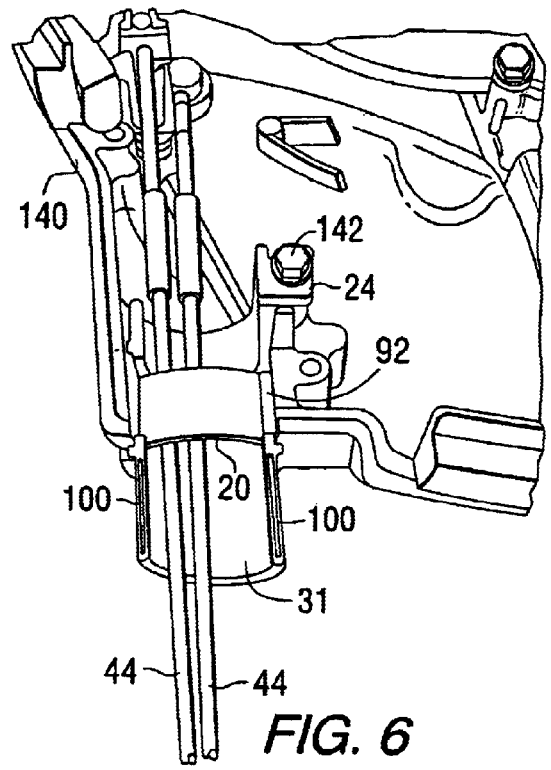

FIG. 6 shows two push-pull cables 44 disposed within the first region 31 with the divider 20 moved to its first position which is in a position to divide the cavity into the first and second regions.

Figure 7:
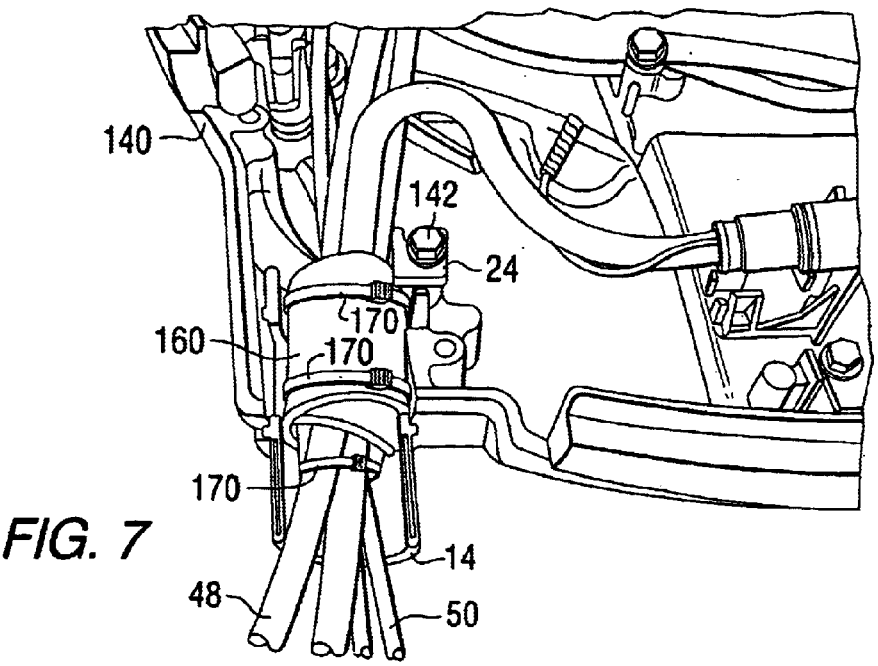

FIG. 7 shows hoses 48 and wires 50 disposed above the divider 20. In certain uses of the present invention, a protective material 160 can be wrapped around the hoses 48 and wires 50 to further protect their outer surfaces from abrasion. Cable ties 170 can be used to further limit the movement of the protective material 160 relative to the hoses 48 and wires 50.

Figure 8:
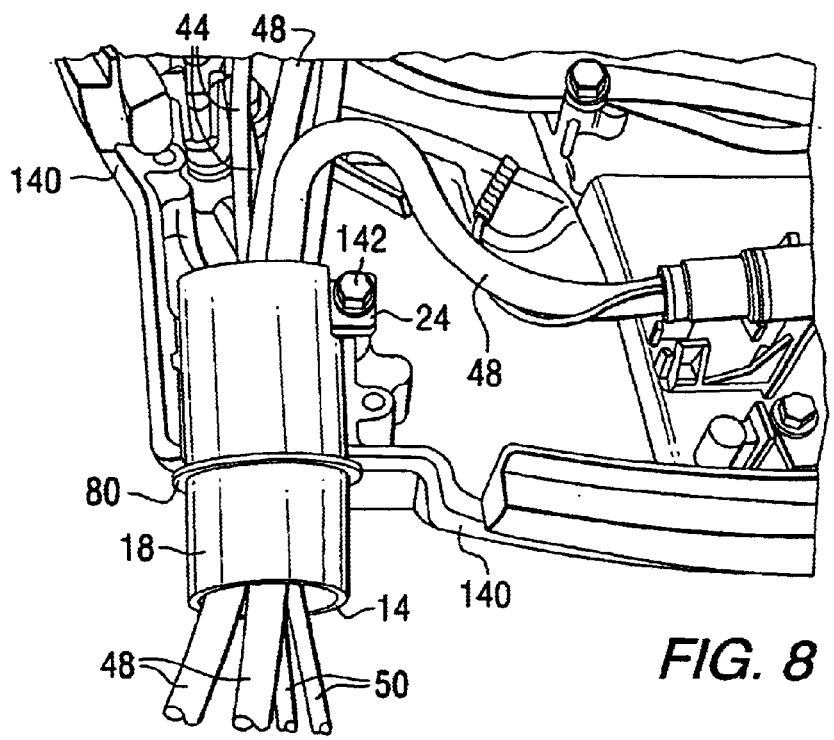

FIG. 8 shows the second portion 18 in place over the first portion 14 to form the generally tubular conduit of the protective containment device 10. The hoses 48 and wires 50 are shown extending through the cavity formed within the protective containment device. The generally tubular conduit of the present invention is illustrated in FIG. 8 as being generally cylindrical with two open ends through which the hoses 48, wires 50, and push-pull cables 44 can be extended.

Figure 9:
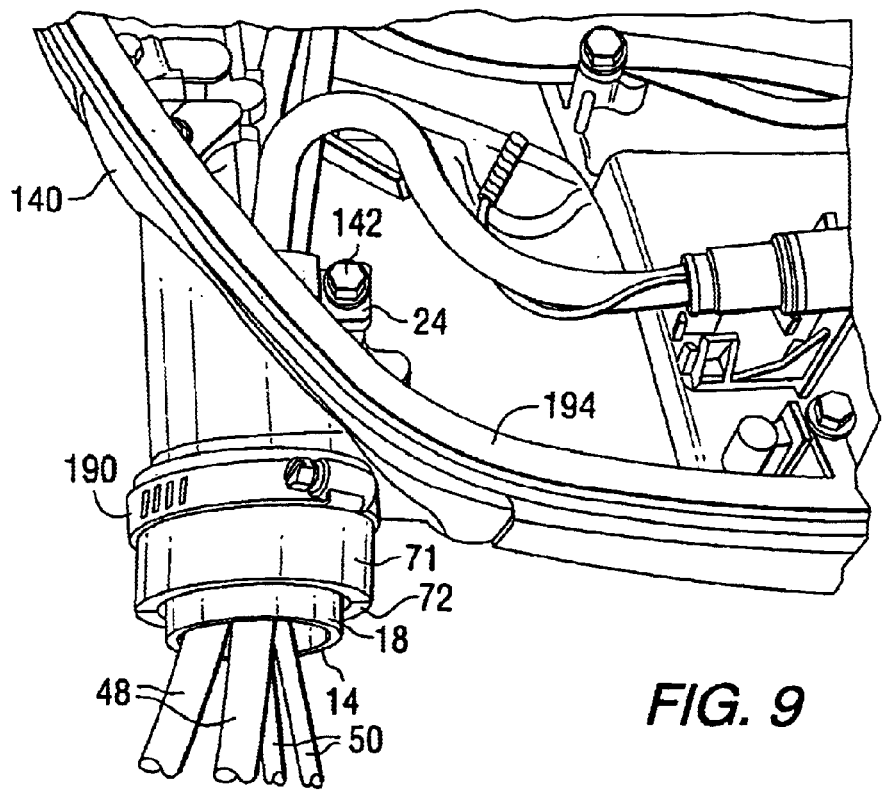

FIG. 9 shows the first and second retainers, 71 and 72, disposed around the first and second portions, 14 and 18, and held in place by a clamp 190. It should be understood that the flexible tube 76, which is described above in conjunction with FIG. 3, is not shown in FIG. 9 for purposes of clarity, but an end of the flexible tube 76 would be captured between the outer surfaces of the first and second portions, 14 and 18, and the inner surfaces of the first and seconds retainers, 71 and 72. That end of the flexible tube 76 would be further held in place by the plurality of pointed protrusions 130 described above in conjunction with FIG. 4. The flexible tube would contain the hoses 48, the wires 50, and the push-pull cables 44 for at least a reasonable distance forward from the outboard motor 140 in order to provide additional strain relief for the hoses, wires, and cables. FIG. 9 also shows a seal 194 placed above the protective containment device 10 of the present invention. A cowl would then be placed over the seal 194 to enclose the engine and other components of the outboard motor.

With continued reference to FIGS. 1–9, it can be seen that the present invention provides a protective containment device 10 for an outboard motor 140 which comprises a first portion 14 shaped to be received in an opening formed through a surface of the outboard motor 140 and a second portion 18 shaped to be received in the opening. The first and second portions, 14 and 18, are shaped to be attached together to form a generally tubular conduit having a cavity formed therein. A divider 20 is disposed within the generally tubular conduit and between a first region 31 of the cavity and the second region 32 of the cavity. The first and second regions are each shaped to receive a component selected from the group consisting of electrical wires 50, hoses 48, and push-pull cables 44. The divider 20 is formed as an integral extension of the first portion 14 and is flexibly attached to the first portion 14. The divider 20 is contiguous with the first portion 14 along a flexible hinge 92 which is made of the same material as the divider 20 and the first portion 14. The divider is movable between a first position 20A which is in a position to divide the cavity into the first and second regions, 31 and 32, and a second position 20B which is away from the position to divide the cavity into the first and second regions, 31 and 32. The generally tubular conduit is cylindrical with two open ends to allow the wires 50, the hoses 48, and the push-pull cables 44 to be disposed therethrough. The present invention further comprises a first retainer 71 and a second retainer 72 which are shaped to be attached together to form a cylindrical ring. The cylindrical ring is shaped to receive an outer surface 78 of the generally tubular conduit which comprises the first and second portions, 14 and 18. A flexible tube 76 can be disposed around an end of the generally tubular conduit between the outer surface 78 of the generally tubular conduit and an inner surface 132 of the cylindrical ring. A plurality of pointed protrusions 130 is formed on the inner surface 132 of the first and second retainers, 71 and 72, which form the cylindrical ring.

Although the present invention has been described with particular specificity and illustrated to show a preferred embodiment, it should be understood that alternative embodiments are also within its scope.

We claim:

1. A protective containment device for an outboard motor, comprising:
   a first portion shaped to be received in an opening formed through a surface of an outboard motor;
   a second portion shaped to be received in said opening formed through said surface of said outboard motor, said first and second portions being shaped to be attached together to form a generally tubular conduit having a cavity formed therein; and
   a divider disposed within said generally tubular conduit, said divider being disposed between a first region of said cavity and a second region of said cavity, said first and second regions of said cavity both being defined by an internal surface of said generally tubular conduit and said divider, said second region and being shaped to receive a component selected from the group consisting of hoses and electrical wires and said first region being shaped to receive at least one push-pull cable, said at least one push-pull cable and said component selected from the group consisting of hoses and electrical wires being disposed on opposite sides of said divider, said at least one push-pull cable being movably contained in said first region.

2. The device of claim 1, wherein:
   said divider is an integral extension of said first portion.

3. The device of claim 1, wherein:
   said divider is flexibly attached to said first portion.

4. The device of claim 3, wherein:
   said divider is formed as an integral part of said first portion with said divider being contiguous with said first portion along a flexible hinge which is made of the same material as said divider and said first portion.

5. The device of claim 1, wherein:
   said divider is movable between a first position which is in a position to divide said cavity into said first and second regions and a second position which is away from said position to divide said cavity into said first and second regions.

6. The device of claim 1, wherein:
   said generally tubular conduit is cylindrical with two open ends.

7. The device of claim 1, further comprising:
   a first retainer; and
   a second retainer, said first and second retainers being shaped to be attached together to form a cylindrical ring, said cylindrical ring being shaped to receive an outer surface of said generally tubular conduit.

8. The device of claim 7, further comprising:
   a flexible tube disposed around an end of said generally tubular conduit between said outer surface of said generally tubular conduit and an inner surface of said cylindrical ring.

9. The device of claim 8, further comprising:
   a plurality of pointed protrusions formed on said inner surface of said cylindrical ring.

10. A protective containment device for an outboard motor, comprising:
    a first portion shaped to be received in an opening formed through a surface of an outboard motor;
    a second portion shaped to be received in said opening formed through said surface of said outboard motor, said first and second portions being shaped to be attached together to form a generally tubular conduit having a cavity formed therein; and
    a divider disposed within said generally tubular conduit, said divider being disposed between a first region of said cavity and a second region of said cavity, said first and second regions of said cavity both being defined by an internal surface of said generally tubular conduit and said divider, said second region being shaped to receive a component selected from the group consisting of hoses and electrical wires and said first region being shaped to receive at least one push-pull cable, said at least one push-pull cable and said component selected from the group consisting of hoses and electrical wires being disposed on opposite sides of said divider, said at least one push-pull cable being movably contained in said first region, said divider being an integral extension of said first portion and being flexibly attached to said first portion.

11. The device of claim 10, wherein:
    said divider is contiguous with said first portion along a flexible hinge which is made of the same material as said divider and said first portion.

12. The device of claim 11, wherein:
    said divider is movable between a first position which is in a position to divide said cavity into said first and second regions and a second position which is away from said position to divide said cavity into said first and second regions.

13. The device of claim 12, wherein:
    said generally tubular conduit is cylindrical with two open ends.

14. The device of claim 13, further comprising:
    a first retainer; and
    a second retainer, said first and second retainers being shaped to be attached together to form a cylindrical ring, said cylindrical ring being shaped to receive an outer surface of said generally tubular conduit.

15. The device of claim 14, further comprising:
    a flexible tube disposed around an end of said generally tubular conduit between said outer surface of said generally tubular conduit and an inner surface of said cylindrical ring.

16. The device of claim 15, further comprising:

a plurality of pointed protrusions formed on said inner surface of said cylindrical ring.

17. A protective containment device for an outboard motor, comprising:

a first portion shaped to be received in an opening formed through a surface of an outboard motor;

a second portion shaped to be received in said opening formed through said surface of said outboard motor, said first and second portions being shaped to be attached together to form a generally tubular conduit having a cavity formed therein; and a divider disposed within said generally tubular conduit, said divider being disposed between a first region of said cavity and a second region of said cavity, said first and second regions of said cavity both being defined by an internal surface of said generally tubular conduit and said divider, said second region being shaped to receive a component selected from the group consisting of hoses and electrical wires and said first region being shaped to receive at least one push-pull cable, said at least one push-pull cable and said component selected from the group consisting of hoses and electrical wires being disposed on opposite sides of said divider, said at least one push-pull cable being movably contained in said first region, said divider being an integral extension of said first portion and being flexibly attached to said first portion.

18. The device of claim 17, wherein:

said divider being contiguous with said first portion along a flexible hinge which is made of the same material as said divider and said first portion and being movable between a first position which is in a position to divide said cavity into said first and second regions and a second position which is away from said position to divide said cavity into said first and second regions.

19. The device of claim 17, wherein:

said generally tubular conduit is cylindrical with two open ends.

20. The device of claim 19, further comprising:

a first retainer;

a second retainer, said first and second retainers being shaped to be attached together to form a cylindrical ring, said cylindrical ring being shaped to receive an outer surface of said generally tubular conduit;

a flexible tube disposed around an end of said generally tubular conduit between said outer surface of said generally tubular conduit and an inner surface of said cylindrical ring; and a plurality of pointed protrusions formed on said inner surface of said cylindrical ring.

* * * * *